United States Patent Office 2,839,468
Patented June 17, 1958

2,839,468

JET TURBINE LUBRICANT COMPOSITION

William T. Stewart, El Cerrito, and George J. Benoit, Jr., San Anselmo, Calif., assignors to California Research Corporation, San Francisco, Calif., a corporation of Delaware No Drawing. Application May 10, 1956
Serial No. 583,921

3 Claims. (Cl. 252—32.5)

This invention relates to a novel lubricant composition, and it is particularly directed to the provision of a lubricant which is especially suitable for use in jet engines employed in aircraft.

Lubricating oils used in jet engines are subjected to operating conditions so severe that few if any oils are available which are satisfactory in all particulars. The chief causative factor leading to oil failure in jet aircraft engines is the high temperature—550 to 650° F. or even higher—of many of the surfaces with which the lubricating oil comes in contact. Such temperatures normally induce rapid carbon formation, or coking in the oil and also greatly accelerate oxidative deterioration of the oil in the presence of air. Further, the gear trains employed in jet engines are highly loaded and impose severe extreme pressure and anti-wear conditions on the lubricant. Since aircraft must operate at abnormally low temperatures such as those encountered in the arctic and at high altitudes, it is also essential that the oil be adapted for use at both high as well as low temperatures.

In order for a lubricant to meet the severe operating conditions encountered in jet aircraft service, it is necessary that it possess a number of outstanding characteristics. Thus, the volatility must be low in reference to the viscosity in order to maintain a reasonably low oil consumption rate at high operating temperatures; further, the viscosity-temperature characteristics of the oil must be such as to permit starting of the engine at temperatures well below −50° F., yet give excellent lubrication at the temperatures of 550 to 650° F. encountered in operation. The pour point of the oil must be below −65° F. Since the oil used in gas turbines comes in contact with a variety of metals, it must be noncorrosive to steel, aluminum, magnesium, copper and bronze, and preferably to silver as well. Because of the high gear loadings employed in jet engines, it is necessary that the oil be supplied with additives which impart good end point and anti-wear qualities. Further, it is necessary that the oil be supplied with oxidation inhibitor additives as well as with metal deactivating agents in order to combat the deleterious effect of the high temperatures encountered in the engine. There is a wide variance between oils in their response to oxidation inhibitor additives, and it is therefore important not only to employ such additives, but to use as the base fluid an oil which gives a good inhibitor response. Lastly, from the standpoint of engine performance, it is also important that the oil have substantially no foaming tendencies, which quality can be imparted by the addition of an anti-foaming agent.

Aside from the foregoing engine-performance characteristics, it is also of great importance that a jet lubricant have certain other qualities as well. Thus, it should be compatible with and not attack the various rubber packings, rings and hoses, as well as the paint and electrical insulating materials which come into contact with the oil either continuously, or during periods of engine failure or servicing.

It is known that the desired pour point, volatility and temperature-viscosity characteristics required in a jet turbine lubricant can best be met by synthetic oil rather than a mineral oil. Such synthetic oils include oils obtained by polymerization of lower molecular weight alkylene oxides such as propylene and/or ethylene oxide. One of the better types of synthetic oil hitherto proposed for use as the base fluid of a jet turbine lubricant is believed to be an alkyl diether of poly-1,2-oxypropylene glycol, and a jet lubricant composition based on this glycol diether is described and claimed in copending application Serial No. 383,386, filed September 30, 1953, now Patent No. 2,801,968. However, while this glycol diether base fluid has little inherent tendency to form coke at the elevated temperature encountered in jet aircraft engines, this is not the case when this base fluid has been supplied with the conventional extreme pressure, oxidation inhibitor, anti-wear, metal deactivator and foam inhibitor additives which are necessary.

As described in the aforesaid copending application, it is possible to reduce the coking tendencies of the compounded oil from values in the range of about 800 to 1000 (as determined in the coking test described in the examples below) to those of approximately 300 to 350 by the use of a particular combination of additives which prove noncorrosive to all the metals encountered in jet engines. While the resulting lubricant composition is satisfactory for use in jet aircraft engines wherein the surface temperatures encountered by the oil do not exceed about 525 to 575° F. (or even 600° F. for short periods of time), such oils cannot be employed in the latest types of jet aircraft engines where the temperatures encountered by the oil are in the range of 600 to 650° F. and even higher. For such engines the present military requirement is that the oil, in addition to being non-corrosive to steel, aluminum, magnesium, copper and silver, shall have a coking value which is not materially greater than about 100. Accordingly, it is an object of the present invention to provide a jet turbine lubricant composition which will meet this, as well as the other significant requirements of the military and civilian specifications for jet engines operated at temperatures above 600° F.

It is our discovery that the foregoing object is achieved in a particular embodiment of the invention by employing a lubricant composition which, in addition to the defined additive components, as described in succeeding portions of the specification, incorporates as the base fluid an alkyl diether of a mixed oxyethylene-1,2-oxypropylene glycol polymer. It was found that quite unexpectedly, and for no reason of which applicants are aware, the said mixed polyglycol diethers not only possess an intrinsically low coking value, but also have the ability to be compounded with certain extreme pressure, oxidation inhibitor, anti-wear, metal deactivator and foam inhibitor additives to provide finished lubricant compositions which have coking values below 100 and can be employed with outstanding success in jet engines operated at temperatures well above 600° F. without giving rise to coking, corrosion, or other difficulties. Further, the resulting compositions not only have the desired pour point, volatility and temperature-viscosity characteristics, but they are substantially non-reactive with the various rubber, paint and insulating materials employed in jet engines. They also have the desirable attribute of being compatible in all proportions with either low or high viscosity hydrocarbons and aircraft oils as well as with the diester types of synthetic oils, thereby permitting blending with said oils under emergency conditions without harm to the engine.

The present composition is made up in major proportion, preferably from about 90 to 98%, of an alkyl diether of a polyalkylene glycol which is essentially comprised of a mixture of oxyethylene and 1,2-oxypropylene

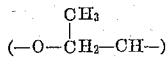

units. While the commercially available mixtures of ethylene oxide and propylene oxide from which the present polyglycol materials are prepared may contain minor amounts of other glycols such as 1,3-propylene oxide or the various butylene oxides, as a practical matter these materials can be disregarded and the polyoxyalkylene glycol diether base fluid of the present composition can be expressed as being a material of the type having the general formula

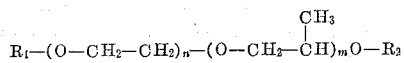

wherein the designated oxyethylene and 1,2-oxypropylene groups are randomly distributed in the molecule, and where $n$ has a value of at least one, $m$ has a value of at least two, $R_1$ and $R_2$ represent alkyl groups of from 1 to 18 carbon atoms each, and where the molecular weight (or average molecular weight) is between 350 and 700, of which at least 250 is attributable to the oxyethylene and 1,2-oxypropylene groups apart from the $R_1$ and $R_2$ end groups.

As has been indicated above, it is also contemplated that the mixed polyglycol molecule may contain a relatively small percentage (not greater than about 10 or 15%) of other oxyalkylene units such as oxytrimethylene and the various oxybutylene groups, for example, since the latter are commonly found in many commercially available $C_2$ and $C_3$ oxide starting materials. However, in the preferred compositions of this invention the oxyethylene and 1,2-oxypropylene units are substantially the only oxyalkylene units present in the molecule apart from the ether-linked alkyl end groups.

In the preferred compositions of the present invention, the mixed $C_2$–$C_3$ polyglycol diethers are those of the type wherein one of the alkyl radicals designated by $R_1$ and $R_2$ contains from 1 to 3 carbon atoms, while the other of said radicals contains from 4 to 10 carbon atoms. Further, the molecule preferably contains from 33 to 75 mole percent of 1,2-oxypropylene groups, and, conversely, from 67 to 25 mole percent of the oxyalkylene groups. As regards physical properties, the preferred polyglycol diether base fluids have viscosities between about 5,000 and 12,000 cs. at −65° F. and between about 2.5 and 3.5 cs. at 210° F., these figures all being determined in the absence of any additive, or compounding ingredients. All of the diether base fluids of the type described above have pour points below about −65° F. and flash points about about 350° F.

In general, the $C_2$–$C_3$ polyglycol diether base fluids of the present invention, as prepared by conventional methods, will represent mixtures of varying chain length and molecular configuration. Accordingly, the data given above and elsewhere herein is to be taken as either describing individual polyglycol diether compounds or mixtures of said compounds, in which latter case the data given refer to the average values evidenced by the mixture as a whole.

The $C_2$–$C_3$ polyglycol diether base fluids described above are generally known in the art and are of the type described, for example, in U. S. Patent No. 2,425,755, issued August 19, 1947, to Roberts et al. The present polyglycol diethers are normally prepared by reacting a mixture of ethylene and 1,2-propylene oxides (in the proportion of 33 to 75 mole percent of the propylene oxide to from 67 to 25 mole percent of the propylene oxide) with a minor amount (usually from about 8 to 20 mole percent) of a monohydric aliphatic alcohol in the presence of an alkaline catalyst. Following the completion of this reaction the resulting polymerization product is esterified so as to replace the terminal hydroxy group by an alkoxy radical, thereby forming the diether. The alcohol reacted with the 1,2-propylene oxide is a primary or secondary monohydric alcohol such as methanol, ethanol, n-propanol, 2-propanol, n-butanol, 2-methylpropanol, 2-butanol, n-pentanol, 3-methylbutanol, 2-methylbutanol, n-hexanol, 2-ethylbutanol, 2-methylpentanol, 3-methylpentanol, n-heptanol, 2-methylhexanol, 2,2-dimethylpentanol, n-octanol, 2-ethylhexanol, "isooctyl alcohol" (a $C_8$ alcohol prepared by way of the Oxo synthesis), n-decanol, n-dodecanol, or the like. Generally speaking, any alcohol having a pour point below about 75° F. can be reacted with the mixed ethylene-propylene oxides to produce a material which, when converted to the diether, will have a pour point below −65° F. If desired, mixtures of two or more alcohols can be employed, thereby producing a mixture of polymeric material having different alkyl groups attached at the one end of the molecular chain. Preferably the alcohol employed to initiate the reaction is one of branched-chain configuration having from 4 to 10 carbon atoms.

The monoether products obtained by a practice of the method described above where the mixture of alkylene oxides is reacted with a monohydric aliphatic alcohol normally contain a free hydroxyl group at one end of the molecule and the ether-linked alkyl radical (which can be designated as $R_1$ in the structural formula given above) at the other end of the molecule. The polyglycol diethers of the present invention can thereafter be prepared by replacing the terminal hydroxyl group of the monoether intermediate with an alkoxy radical containing from about 1 to 18 carbon atoms, though preferably from 1 to 3 carbon atoms, the resulting alkyl group which thus becomes linked to the molecule being designated as $R_2$ in the structural formula given above. This etherification can be effected by reacting the monoether, or mixture of monoethers, with a suitable alkyl sulfate in the presence of caustic, though the reaction is preferably effected by first reacting the monoether with a dispersion of metallic sodium to convert the polymer to the corresponding sodium salt and then reacting the salt with the desired alkyl chloride.

Instead of employing a monohydric alcohol of the type described above to supply the $R_1$ radical and initiate the polymerization reaction, the mixture of ethylene and propylene oxide starting materials can be reacted with an $\alpha,\beta$-dihydric alcohol such as ethylene glycol or 1,2-propylene glycol in the presence of a suitable catalyst. In this case the resulting polymer has a terminal hydroxy group at each end of the molecule and both of said groups are replaced by alkoxy groups in a subsequent etherification of the type described above. Still other methods of preparation will suggest themselves to those skilled in the art.

The lubricant compositions of the present invention are suitably prepared by combining polyglycol diether base fluids of the type described above with the particular additive which has been found to give the desired final product, as will now be described.

As the oxidation inhibitor there is employed from 0.2 to 5%, and preferably from 0.5 to 3%, by weight, of a compound selected from the group consisting of phenyl-α-naphthylamine, phenothiazine and the dialkyl selenides such as dihexyl selenide, didodecyl selenide, hexyl dodecyl selenide, di(2-ethylhexyl) selenide, dioctadecyl selenide, isooctyl hexadecyl selenide, and the like, wherein the alkyl groups attached to the selenium atom contain from 6 to 18 carbon atoms each. Of these inhibitors, the preferred compound is phenyl-α-naphthylamine.

The extreme pressure additive is employed in the amount of from 0.05 to 1%, and preferably of from 0.1 to 0.5% by weight. This compound is selected from the group consisting of alkylamine salts of acid alkyl esters of phosphoric acid and blends of said salts with acid alkyl esters of phosphoric acid in which the amine salt constitutes at least 25% by weight, the alkyl groups here referred to containing from 8 to 18 carbon atoms each. Suitable additives coming within this group are dodecylamine dodecyl acid phosphate, blends made up of from 25 to 95% of dodecylamine dodecyl acid phosphate and from 75 to 5% of dodecyl dihydrogen phosphate, octylamine dioctyl phosphate, di(decylamine)dodecyl phosphate, hexadecylamine dodecyl acid phosphate, octadecylamine dioctadecyl phosphate, and blends containing 2-ethylhexylamine 2-ethylhexyl acid phosphate and 2-ethylhexyl dihydrogen phosphate in equal proportions. A preferred extreme pressure additive is a blend made up of an alkylamine acid alkyl phosphate with an alkyl dihydrogen phosphate, in which blend the amine salt component is present to the extent of from 25 to 95% by weight.

The anti-wear additive is present in the amount of from 0.5 to 5% and is a compound selected from the group consisting of neutral aryl phosphates and neutral alkyl aryl phosphates. Representative additives coming within this grouping are triphenyl phosphate, tricresyl phosphate, butyl diphenyl phosphate, phenyl dibutyl phosphate, benzyl dicresyl phosphate, trixylyl phosphate and diphenyl cresyl phosphate. A preferred additive of this class is tricresyl phosphate.

The metal deactivator additive, which is present in the amount of from 0.005 to 0.2%, and preferably from 0.01 to 0.1%, by weight, is a compound selected from the group consisting of quinizarin, alizarin, purpurxanthrene, anthrarufin, and chrysazin. The preferred additive of this class is quinizarin.

As the foam inhibitor there is employed from 0.0001 to 0.02% of a di(lower alkyl)silicone polymer such as dimethyl silicone, diethyl silicone, methyl ethyl silicone and methyl pentyl silicone. The preferred additive of this class is dimethyl silicone.

The lubricant composition of the present invention is illustrated by the following examples.

*Example I*

In this operation a lubricant composition was employed having the following composition:

96.78% methyl-2-ethylhexyl diether of poly(mixed ethylene-propylene)glycol
0.12% dodecylamine dodecyl acid phosphate
0.08% dodecyl dihydrogen phosphate
2.0% tricresyl phosphate
1.0% phenyl-α-naphthylamine
0.02% quinizarin
0.001% dimethyl silicone The glycol diether base fluid employed in the foregoing composition was one which had been formed by polymerizing equimolar proportions of ethylene oxide and 1,2-propylene oxide in the presence of 2-ethylhexanol and thereafter replacing the terminal hydroxy group of the resulting monoether with a methoxy radical, the diether employed representing a mixture having an average molecular weight of approximately 440 and containing an average of approximately 2.9 monomer units each of oxyethylene and 1,2-oxypropylene in the diether molecule. While this base fluid had viscosities of 5900, 9.09 and 2.80 cs. at temperatures of —65°, 100° and 210° F., respectively, the overall compounded lubricant had the following viscosity and other indicated physical properties:

Viscosity at —65° F., cs _____ 8390.
Viscosity at 100° F., cs _____ 9.95.
Viscosity at 210° F., cs _____ 2.86.
Viscosity index _____ 155.
Pour point, ° F _____ Below —75.
Flash point, ° F _____ 370.
Corrosion properties _____ Noncorrosive to steel, magnesium, aluminum, copper and silver.
Falex E. P. test, lbs _____ 4500.
Coking test, mgs _____ 70±5.

In the above tabulation of data, the coking test referred to is one wherein the oil in a bath maintained at a constant level is splashed against an overhead inclined plate maintained at a temperature of 600° F. by steel wires on a wheel partially immersed in said oil rotated at a speed of 1050 R. P. M. The coking value is obtained by measuring the weight of deposit formed on the underside of the plate in mgs. during a 10-hour test period. The load-carrying capacity of the lubricant is determined by a Falex E. P. test wherein the conventional equipment is operated at 300 R. P. M. at a temperature of 70° F., the load at failure being recorded in pounds.

This application is a continuation-in-part of application Serial No. 383,404, filed September 30, 1953, now abandoned.

We claim:

1. A lubricant composition comprising (a) from 90 to 98% by weight of a mixture of methyl-2-ethylhexyl diethers of poly(oxyethylene - 1,2 - oxypropylene) glycols having approximately equimolar proportions of said oxyethylene and 1,2-oxypropylene groups, and having a molecular weight between about 350 and 700, a viscosity between 5,000 and 12,000 cs. at —65° F. and 2.5 and 3.5 cs. at 210° F., a pour point below —65° F., and a flash point above 350° F., (b) from 0.5 to 3% of phenyl-α-naphthylamine, (c) from 0.1 to 0.5% by weight of a blend of an alkylamine acid alkyl phosphate with an alkyl dihydrogen phosphate wherein the amine salt component is present to the extent of from 25 to 95% by weight, the alkyl groups in said ester containing from 8 to 18 carbon atoms each, (d) from 0.5 to 5% by weight of tricresyl phosphate, (e) from 0.01 to 0.1% by weight of quinizarin, and (f) from 0.0001 to 0.02% by weight of dimethyl silicone polymer foam inhibitor.

2. A lubricant composition comprising (a) from 90 to 98% by weight of a mixture of methyl-2-ethylhexyl diethers of poly(oxyethylene - 1,2 - oxypropylene) glycols having approximately equimolar proportions of said oxyethylene and 1,2-oxypropylene groups, and having a molecular weight of approximately 440, a viscosity of about 5900 at —65° F. and 2.8 at 210° F., a pour point below —65° F., and flash point above 350° F., (b) from 0.5 to 3% of phenyl-α-naphthylamine, (c) from 0.1 to 0.5% by weight of a blend of an alkylamine acid alkyl phosphate with an alkyl dihydrogen phosphate wherein the amine salt component is present to the extent of from 25 to 95% by weight, the alkyl groups in said ester containing from 8 to 18 carbon atoms each, (d) from 0.5 to 5% by weight of tricresyl phosphate, (e) from 0.01 to 0.1% by weight of quinizarin, and (f) from 0.0001 to 0.02% by weight of dimethyl silicone polymer foam inhibitor.

3. A lubricant composition comprising (a) 96.78% by weight of a mixture of methyl-2-ethylhexyl diethers of poly(oxyethylene-1,2-oxypropylene) glycols having approximately equimolar proportions of said oxyethylene and 1,2-oxypropylene groups, and having a molecular weight of approximately 440, a viscosity of about 5900 at —65° F. and 2.8 at 210° F., a pour point below —65° F., and a flash point above 350° F., (b) 1.0% of phenyl-α-naphthylamine, (c) 0.2% by weight of a blend of an alkylamine acid alkyl phosphate with an alkyl dihydrogen phosphate wherein the amine salt component is present to the extent of from 25 to 95% by weight, the alkyl groups in said ester containing from 8 to 18 carbon atoms each, (d) 2.0% by weight of tricresyl phosphate, (e) 0.02% by weight of quinizarin, and (f) 0.001% by weight of dimethyl silicone polymer foam inhibitor.

References Cited in the file of this patent

UNITED STATES PATENTS

| | | |
|---|---|---|
| 2,285,853 | Downing | June 9, 1942 |
| 2,375,007 | Larsen | May 1, 1945 |
| 2,420,953 | Hunt | May 20, 1947 |
| 2,425,755 | Roberts | Aug. 19, 1947 |
| 2,672,447 | Stewart | Mar. 16, 1954 |

FOREIGN PATENTS

| | | |
|---|---|---|
| 601,419 | Great Britain | May 5, 1948 |